ns

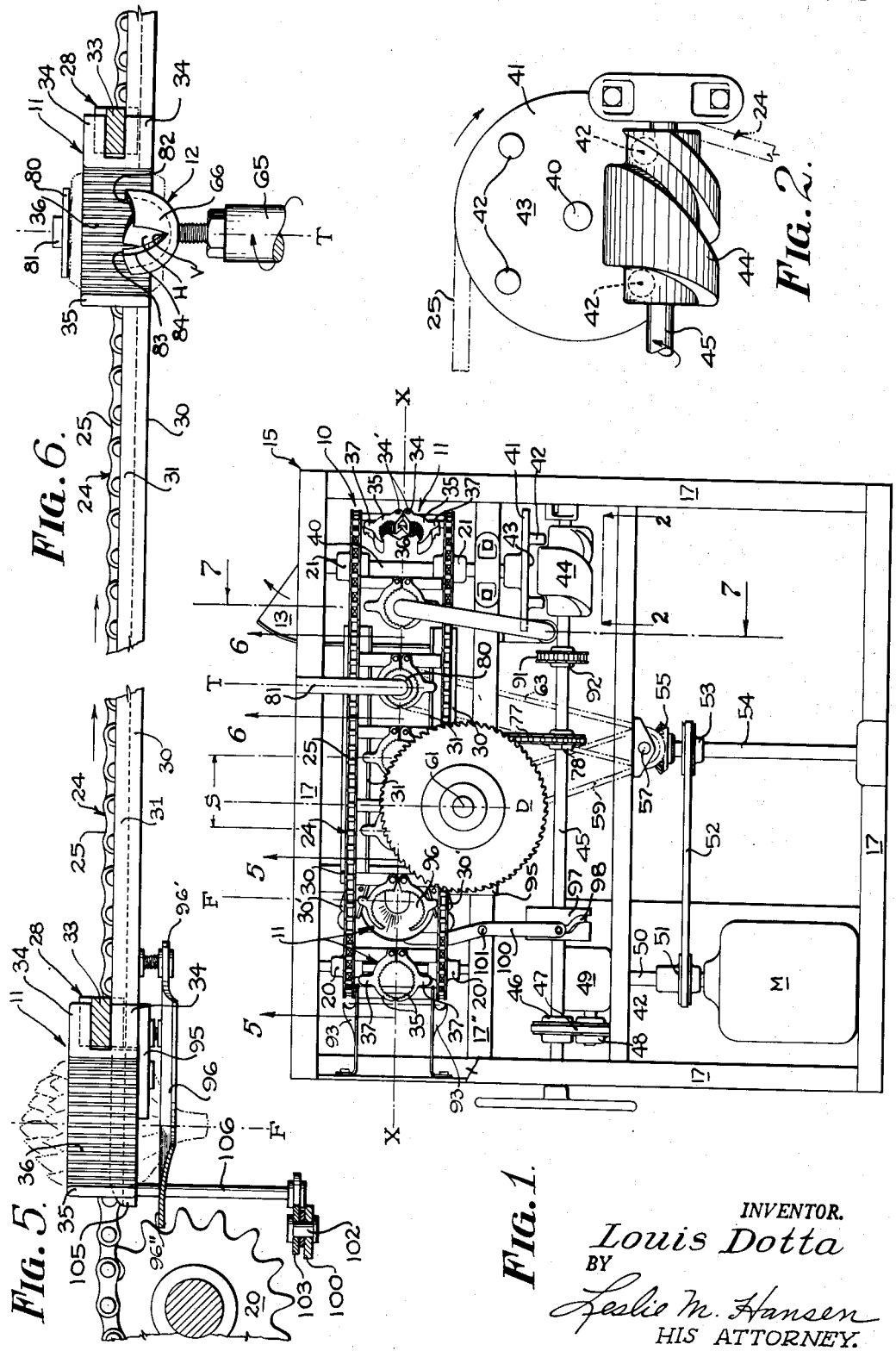

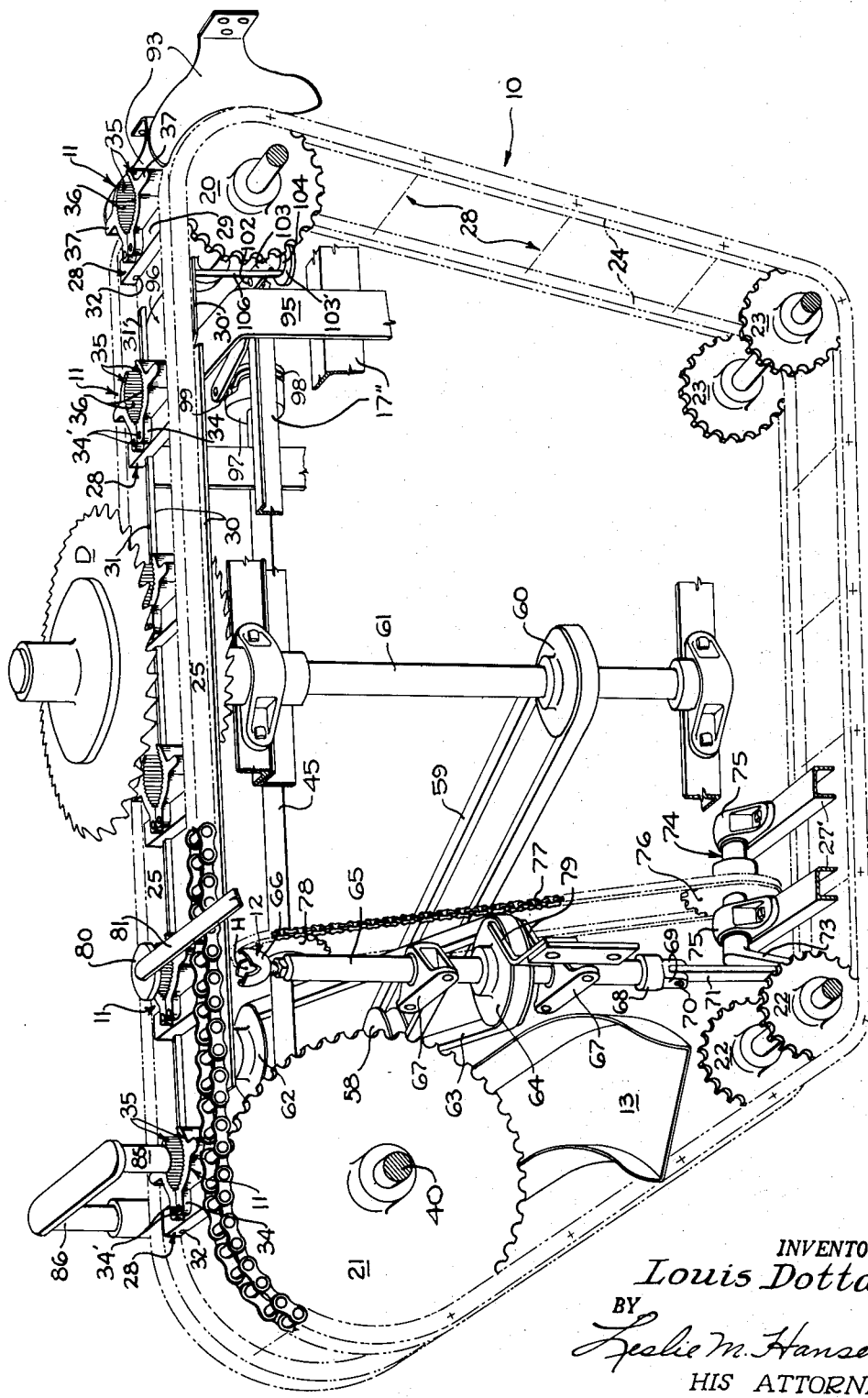

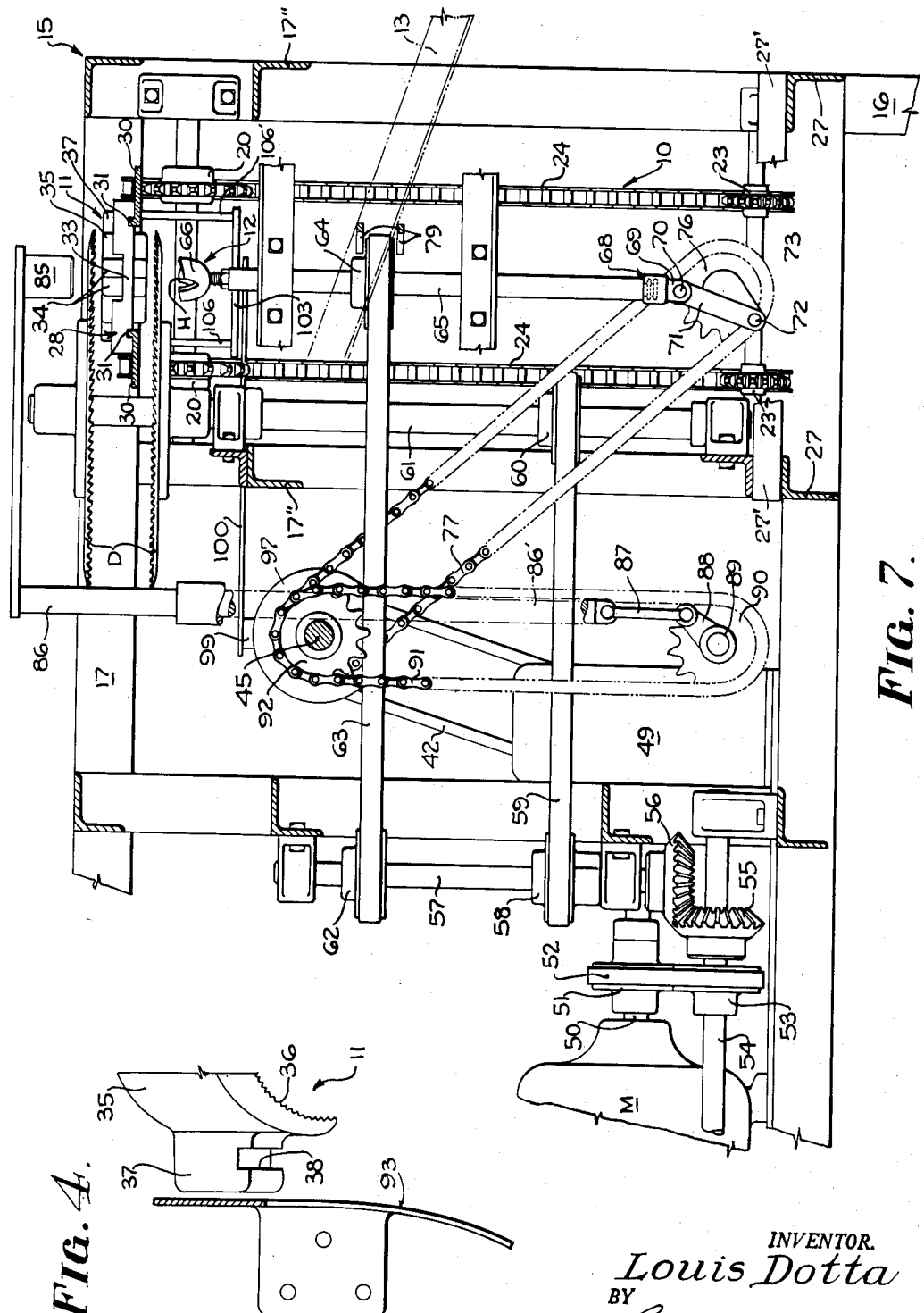

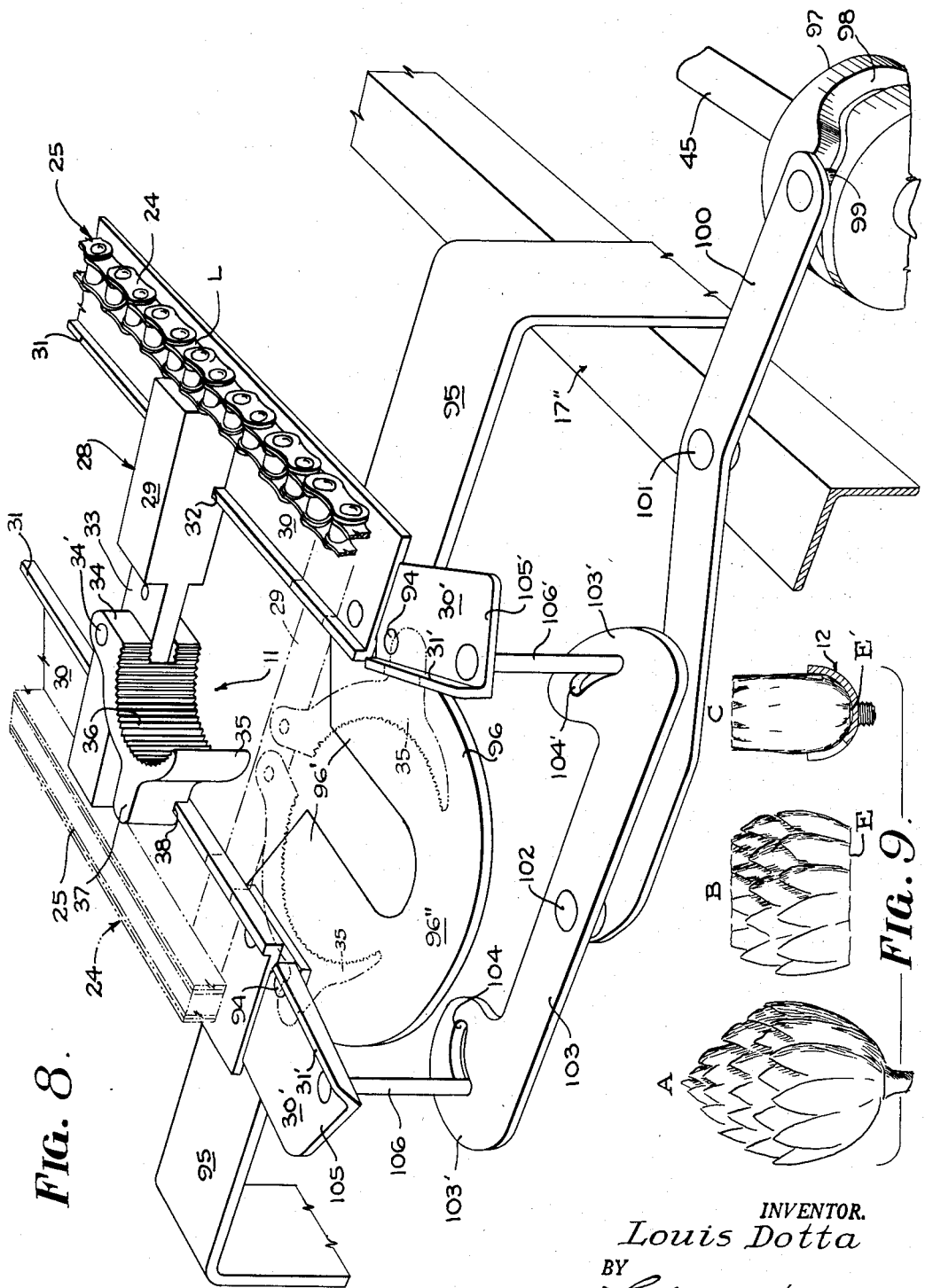

United States Patent Office 2,716,480
Patented Aug. 30, 1955

2,716,480

CONVEYOR FOR ARTICHOKE PREPARATION MACHINE

Louis Dotta, San Jose, Calif.

Application May 23, 1951, Serial No. 227,848

7 Claims. (Cl. 198—33)

This invention relates to apparatus for handling and preparing artichokes incident to canning or preserving a substantial edible portion of the fruit.

Heretofore numerous devices have been developed for handling and cutting both tip and butt ends of artichokes as well as for removing the heart of the fruit from within the whole fruit. For the state of the art, reference can be made to United States Patent No. 1,906,438 issued to H. A. Vetch, May 2, 1933, and to Patent No. 2,204,846 which issued to me, June 18, 1940.

The present application is directed to improvements in artichoke preparation machines and has as an object to provide a conveyor coordinated with a tip and butt cutting means as well as a fruit trimming device in a very effective manner.

Another object is to provide an automatically operable fruit holder and means cooperable therewith for holding the fruit firmly incident to the cutting and trimming operation.

Another object is to provide a trimming device cooperable with the fruit holding jaws for cutting exterior leaf structure from an artichoke.

A further object is to provide a novel cutting head on the trimming devices for cutting into the butt end of an artichoke held by the fruit clamping jaws for severing exterior foliage from the fruit.

Still another object of this invention is to provide a flight type conveyor having fruit clamping jaws so disposed as to receive the fruit in a manner to assure orientation of the fruit relative to the cutting and trimming knives.

A still further object of this invention is to provide a jaw operating mechanism for opening and closing the fruit clamping jaws momentarily while they are at rest in register with a fruit receiving and orienting cup.

These and other objects and advantages of the present invention will become apparent in the following description when read in the light of the drawings in which:

Fig. 1 is a view of the present machine as seen from above.

Fig. 2 is a partial detail of an intermittent drive mechanism shown in Fig. 1 and as seen from line 2—2 in Fig. 1.

Fig. 3 is a skeletonized perspective view of the general assembly of Fig. 1 exclusive of the frame structure thereof.

Fig. 4 is a fragmentary detail at enlarged scale of certain jaw operating mechanism seen in Figs. 1 and 3.

Fig. 5 is an enlarged longitudinal section at the feed station of Fig. 1 and taken along line 5—5 thereof.

Fig. 6 is an enlarged longitudinal section at the trimming station of Fig. 1 and taken along line 6—6 thereof.

Fig. 7 is a partial cross section through Fig. 1 as seen substantially along line 7—7 thereof.

Fig. 8 is an enlarged perspective view of the feed station of the machine as shown in Figs. 1 and 5, certain parts being removed for purposes of illustration.

Fig. 9 is an illustration of the three stages of the fruit: A, the whole artichoke which is introduced at the feed station; B, the same fruit with its butt and tip ends removed; and C, the final product discharged from the machine.

In general the machine embodying the present invention comprises an intermittently operated conveyor 10 having a plurality of fruit gripping jaws 11 each adapted to receive an artichoke at a feed station F. This invention further contemplates tip and butt cutting saws D and a trimming tool 12 coordinating with the fruit gripping jaws 11. That is to say the conveyor 10 and gripping jaws effect transmittal of the fruit past a butt and tip cutting station S and subsequent registry of the fruit with the trimming tool T2 at a trimming station T. Thereafter the fruit is discharged via a chute 13 onto a viewing conveyor, not shown, where an attendant can examine the fruit previous to blanching and canning of the fruit.

More specifically the foregoing features are embodied in a frame 15 having legs 16 at its four corners for supporting upper angle irons 17 at counter height above floor level. The conveyor 10 comprises four sets of sprockets 20, 21, 22 and 23, Fig. 3, journalled strategically within the frame 15 and adjacent one side thereof for supporting a pair of chains 24 in parallel relation with their upper reaches 25 disposed to run in a plane coincident to the upper angle irons 17. In connection with the foregoing the sprockets 20 are disposed adjacent the feed station F, the sprockets 21 are adjacent the discharge chute 13 to support the upper reaches 25 of chain 24. The sprockets 22 and 23 are arranged on angle irons 27 at a lower level in the frame to guide and tauten the chains 24 in a predetermined loop to provide space for the trimming tool 12 below the upper reaches of the chains. The chains 24 carry a plurality of flights 28 which are identical so that only one of them need be explained in detail. Each flight 28 includes a transverse bar 29 having its ends suitably secured to one link L of each chain 24. In this manner each bar is moved in unison with the chains 24 and transversely between them.

It should here be noted that each upper reach 25 of the chains 24 is supported on a separate plate 30 so as to hold these reaches 25 truly horizontal. Moreover, each plate 30 has an upstanding bead 31 which fits into a groove 32 formed on the under side of the transverse bar 29 for guiding the same in true transverse disposition between the chains 24.

Each transverse bar 29 has its mid section cut away both above and below forming a reduced mid flange 33 to receive spaced trunnions 34 of individual jaws 35. Two such jaws 35 comprise fruit gripping jaws 11 which are associated with the conveyor 10 as hereinbefore mentioned. Each individual jaw 35 is pivotally connected by a vertical pin 34' to the reduced mid flange 33 at either side of a center line X between the two chains 24.

Each pair of jaws has opposing half circle faces 36 in which vertically extending fluting is formed to firmly grip a fruit between the jaws. These jaws 35 tend to normally hang in open condition when within all but the upper reach of the chains 24. Each jaw has a lug 37 extending laterally away from its outer arcuate face perpendicular to the trunnion portions 34 thereof. These lugs 37 are adapted to ride upon the adjacent plates 30 so as to be supported in a position to trail horizontally rearward of the transverse bar 29 as the latter is moved with the chains 24. Each lug 37 is also provided with a groove 38 on its lower surface adapted to ride the bead 31, hereinbefore mentioned, formed on the adjacent plate 30. In this manner each pair of jaws 35 is maintained in closed or fruit gripping position while traveling from the feed station F to the discharge chute 13.

The sprockets 21 adjacent the discharge station or chute 13 are secured to a drive shaft 40 having an intermittent drive disc 41 secured thereto within the frame 15. This drive disc, as shown in Figs. 1 and 2, carries rollers 42 at quadrantal points on its outer face 43 so that at least two of such rollers 42 extend into driving engagement with a spirally grooved cam drum 44. The drum 44 is secured to one end of a countershaft 45 suitably journalled within the frame 15 so as to extend horizontally parallel to the center line between the two chains 24. A pulley 46 is secured to the opposite end of the countershaft 45 and is drivingly connected by a belt 47 to a pulley 48 on a gear reduction unit 49. The unit 49 is driven directly from the drive shaft 50 of a motor M for continuously driving the countershaft 45 and related mechanisms at a uniformly reduced speed.

The drive shaft 50 of the motor M has a pulley 51 secured to it drivingly connected by a belt 52 to a pulley 53 secured to an auxiliary shaft 54, Figs. 1 and 7. This shaft 54 carries a bevel gear 55 which drivingly meshes with a like bevel gear 56 carried by a vertical countershaft 57 for driving the latter at high speed. In this connection the vertical countershaft 57 carries a pulley 58 for driving the saws D by way of a belt 59 trained around a pulley 60 on a spindle 61 which carries the disc saws D. As best seen in Fig. 7 the two disc saws D are rotated in a horizontal plane in spaced relation to straddle the upper reach 25 of the conveyor, one disc above the reach 25 and the other disc below it. Thus the toothed peripheries of the two disc saws will extend adequately beyond the path of movement of fruit in the jaws 35, see Fig. 1, to cut the portions of the fruit extending above and below the jaws 35.

The vertical countershaft 57 also carries a pulley 62 for driving the trimming tool T by way of a belt 63 trained around a pulley 64 slidably keyed to a reciprocable shaft 65 having a trimming knife 66 secured to its upper end. The shaft 65 is suitably journalled on vertically spaced bearings 67 secured to cross braces on the frame 15. The shaft 65 has its vertical axis disposed perpendicular to the center line X of the conveyor 10 and in axial alignment with one set of clamping jaws 11 at rest just beyond the station S occupied by the tip and butt cutting discs D. The lower end of the shaft 65 has a split thrust bearing 68 secured thereto provided with spaced lugs 69 pivotally secured by a pin 70 to one end of a pitman 71. The opposite end of the pitman 71 is pivotally connected by a stud pin 72 carried eccentrically of a crank arm 73 secured to one end of an arbor 74. The arbor 74 is suitably journalled for rotation in bearings 75 mounted on the angle irons 27' at the lower level of the frame 15, Figs. 3 and 7.

A sprocket 76 is secured to the arbor 74 and is drivingly connected by a chain 77 to a sprocket 78 secured to the low speed countershaft 45 whereby the shaft 65 of the trimming tool 12 is reciprocated toward and from the upper reach of the conveyor chains 24. The shaft 65 is constantly rotated at high speed via pulleys 64 and 62 connected by belt 63 to the vertical countershaft 57. The pulley 64 being slidably keyed to the reciprocable shaft 65 is maintained in alignment with the pulley 62 on the vertical countershaft 57 by a fork bracket 79, Fig. 3, secured to the frame 15 in any suitable manner.

The foregoing reciprocation of the trimming tool shaft 65 relative to the upper reach 25 of the conveyor 10 is synchronized with the intermittent drive cam 44 so that when the shaft 65 is in fully raised position the drive disc 41 is idle. In other words, the conveyor 10 is at rest when the trimming knife 66 on shaft 65 is extended between the half circle faces 36 of the clamping jaws 11 registered therewith as illustrated in Fig. 6.

It should here be noted that the pretipped and butted fruit, when in register with the trimming tool 12, is covered by a backing disc or plate 80 which resists the upward thrust of the trimming knife against the fruit. The backing disc or plate 80 is suitably suspended over the trimming station by a bracket 81 secured to one of the angle irons 17 of the frame 15. The movement and withdrawal of the knife 66 relative to the fruit within the jaws 11 is very brief. Consequently, when the cam 44 on countershaft 45 begins to turn the drive disc 41 to drive the conveyor 10 the knife 66 will have been withdrawn from the fruit. In this manner the conveyor 10 is driven intermittently to advance the next successive pair of clamping jaws into register with the trimming tool 12.

As best illustrated in Figs. 3, 6 and 7 the trimming knife 66 is a substantially hemispherical shaped blade having a hollow center H. The half round wall of the hemispherical knife blade 66 is serrated to provide circumferentially arranged saw teeth 82 on the upper edge of the knife. The leading end 83 of each tooth 82 is highest on the blade and the leading edge 84 of each tooth is ground to cut the exterior foliage from the fruit. It will be noted that a crevice V formed between adjacent teeth extend down to a plane slightly above the bottom of the hollow center H of the hemispherical blade. While the blade 66 is adjustably mounted on top of the reciprocable shaft 65, it is preferably disposed thereon to advance the teeth 82 sufficiently to effect cutting action of their leading edges 84 relative to the fruit. In other words, the crevice V between the teeth 82 does not rise above the precut butt end E of the fruit. In this manner only the exterior leaf structure is cut circumferentially from the butt end of the fruit leaving a slight chordal flat surface E' at the butt end of the fruit.

Referring again to the conveyor 10, the clamping jaws 11, after leaving the trimming station T, stop momentarily above the discharge chute 13. When in this position it will be noted that the jaws 11 are no longer held in closed position by the beads 31 on the plates 30 although the lugs 37 on the jaws are still supported on the plates 30. Consequently, the fruit is no longer gripped between the individual jaws 35 and will tend to fall by gravity into the chute 13. The exterior leaf structure, having been severed from the butt end of the fruit, as previously explained, will fall away from the homogeneous interior portion thereof when the artichoke is released from between the clamping jaws.

In connection with the foregoing it will be noted that means are provided for clearing the fruit from between the jaws 35 above the chute 13. This means consists of a fruit discharging punch 85 axially aligned with the fruit and carried by an offset arm extending radially from a rod 86 vertically adjustable from the upper end of a reciprocable shaft 86'. The shaft 86' is supported for vertical reciprocation in suitable bearings secured to the frame 15 and has its lower end operatively connected by a pitman 87 connected to a crank arm 88. The arm 88 is rotatable with an arbor 89 journalled for rotation below and parallel to the low speed countershaft 45. The arbor 89 carries a sprocket 90 drivingly connected by a chain 91 to a sprocket 92 secured to the countershaft 45. The fruit discharging punch 83 is thus operated in timed relation with the intermittent movement of the conveyor 10 so that the punch 83 moves axially into the clamping jaws in register therewith for assuring removal of the trimmed fruit therefrom. This action of the fruit discharging punch occurs simultaneously with the trimming action of the knife 66 at the preceeding station as illustrated in Figs. 1, 3 and 7.

Once each pair of jaws 11 moves off of the plates 30 and away from the fruit discharging position just explained the jaws are free to open up, as illustrated by the extreme right hand pair thereof in Fig. 1. Thereafter each set of clamping jaws hangs freely from the flight bars 29 through the descending, lower lateral and ascending reaches of the conveyor chains 24. However, as each flight of clamping jaws begins to move around the sprockets 20 adjacent the feed station F, the laterally extending lugs 37 of each such jaw engages a stationary cam 93, Figs. 1, 3 and 4. The jaws are thereby brought into proper alignment for reception by the upstanding beads 31 on the plates 30 forming the foundation of the upper reach 25 of the conveyor chain 24.

The plates 30 and their beads 31 are movable at the feed station F as best seen in Fig. 8. In other words the lead portions 30'—31' are severed from the main portions of the plates 30 and are pivotally connected as at 94 on a bracket 95 which supports the respective side plates 30. In this connection a fruit seat or orienting cup 96 is supported between the hinged portions 30' of the plates 30. This cup 96 is U-shaped and has its legs 96' suitably secured to the main or stationary portions of the plates 30. The bight portion 96" of the cup 96 is thus disposed in a position to register with a pair of clamping jaws on a flight which is momentarily stopped at the feed station. The orienting cup 96 is dish shaped to receive the stem end of a whole artichoke the stem of which extends through the open center of the U-shaped cup. Thus the artichoke is disposed in a proper position to be grasped between the jaws 35 of each pair 11 thereof as they register with the cup 96.

In Fig. 8 the bottom outline, a pair of clamping jaws has been shown in phantom for purposes of illustrating their relation to the orienting cup 96 when these jaws are spaced apart. It should here be noted that the transverse bar 29 is adequately supported on the main stationary portion of the side plates 30 while the lugs 37 of each jaw is supported on the hinged portions 30' of the plates. The upstanding heads 31' on these hinged portions 30' being interlocked in the grooves 38 in the lugs 37, the individual jaws 35 will naturally follow the movement of the hinged plates 30'.

The hinged plates 30' are movable into alignment with the main portions of the plates 30 and away from each other intermittently in timed relation with the intermittent movement of the conveyor chains 24. The foregoing movement of the hinged plates 30' is accomplished through suitable mechanism, Fig. 8, operatively associated with a cam 97 secured to the low speed countershaft 45.

The cam 97 has a peripheral track 98 within which a roller 99 is disposed. The roller 99 is suspended from one end of a lever 100 which lever is pivotally connected as at 101 between its ends to a portion 17" of the frame 15. The opposite end of the lever 100 is pivotally connected as at 102 midway the ends of a yoke 103 having arcuate tracks 104—104' formed in its offset extremities 103'. These arcuate tracks 104—104' are disposed below the free ends 105—105' of the hinged plates 30' so as to receive pins 106—106' extending downwardly therefrom. The arrangement is such that the lever 100 rocks in a horizontal plane forth and back once in each revolution of the cam 97. The disposition of the lever 100 during the back stroke is shown in Fig. 8 in which the hinged plates 30' are spread apart to hold the individual jaws 35 in open condition.

It is while the jaws 35 are open that an artichoke is deposited onto the fruit orienting cup 96, the jaws and conveyor otherwise being at rest due to the relationship of the cam drum 44 relative to the drive disc 41. Just prior to operation of the drive disc 41 by the cam drum 44, the cam 97 effects rocking movement of the lever 100 counterclockwise, Fig. 8, to draw the yoke 103 away from the feed station F, i. e. toward the sprockets 20 as best seen in Fig. 5. In this manner the pins 106—106' are forced toward each other by the action of the arcuate slots 104—104' in the extremities of the yoke 103. The hinged plates 30' are thereby moved into alignment with the main or stationary portions of the plates 30. Thus, through connection of the lugs 37 with the upstanding beads 31' on the hinged plates 30', the jaws 35 are forced into gripping relation with the fruit resting on the orienting cup or seat 96. Immediately after the jaws close on the fruit the cam drum 44 effects turning of the drive disc 41 to move the conveyor chains 24 another step. The closed jaws at the feed station F are thereby moved into full support on the main stationary portion of the plates 30 and a new set of jaws coming around the sprockets 20 ride onto the hinged plates 30' while they are in parallel relation.

When the cam drum 44 completes its cycle of operation the drive disc 41 and conveyor chains 24 again come to rest whereupon the cam 97 promptly rocks the lever 100, clockwise, Fig. 8, to open the set of jaws now disposed over the orienting cup 96. In the meantime the previously filled fruit clamping jaws 11 have moved into a position between the spaced saw discs D as best seen in Fig. 1. In this manner the artichoke within those jaws has been tipped and butted as shown at B in Fig. 9, i. e., both tip and stem end of the fruit having been cut off. The tipped and butted fruit is then moved intermittently until it registers with the axis of the trimming tool 12 as previously explained.

While I have described the foregoing structure in specific detail, it will be appreciated by those skilled in the art that variations, modifications and alterations of such structure can be made without departing from the spirit of my invention. I therefore desire to avail myself of all variations, modifications, and alterations as fairly come within the purview of the appended claims.

I claim:

1. In an apparatus for preparing artichokes and like fruit for canning, a frame having an upper surface disposed at counter height, a pair of endless chains arranged in said frame for movement with their upper reaches parallel to each other at the upper surface of said frame, intermittent drive means for moving said chains in predetermined steps, a plurality of flights on said chains spaced from each other a distance coincident to the steps of movement thereof and each comprising a transverse bar having its ends secured to said chains, a pair of clamping jaws each having a trunnion pivotally secured midway the ends of said transverse bar for trailing movement behind said bar, a plate supported on said frame under each of said chains for supporting the upper reach thereof in a horizontal plane, each said plate having an upstanding bead interlocking with a recess formed on the underside of said transverse bar for guiding the latter for movement, a lug extending from each said jaw perpendicular to the trunnion thereon and having a recess formed on its underside for engagement with the upstanding bead on said plate for maintaining said clamping jaws in fruit gripping relation relative to the fruit between them.

2. In an apparatus for preparing artichokes and like fruit for canning, a frame having an upper surface disposed at counter height, a pair of endless chains arranged in said frame for movement with their upper reaches parallel to each other at the upper surface of said frame, intermittent drive means for moving said chains in predetermined steps, a plurality of flights on said chains spaced from each other a distance coincident to the steps of movement thereof and each comprising a transverse bar having its end secured to said chains, a pair of clamping jaws, each jaw having a trunnion pivotally secured to said transverse bar midway its ends for trailing movement behind said bar, a horizontal plate under each of said chains for supporting the upper reach thereof and having an upstanding bead extending parallel to and between said chains, said transverse bar having a recess adjacent each chain interfitting over said beads for guiding the bar for movement with and in transverse disposition relative to said chains, a lug extending from each said jaw perpendicular to the trunnion thereon and having a recess formed on its underside for engagement with the upstanding bead on said plate whereby said jaws are maintained in fruit gripping relation relative to the fruit between them, each said plate having an initial portion thereof mounted for pivotal movement from parallel relation to a position outwardly relative to each other, and means connecting said initial portions of said places for movement toward and from each other in timed relation to said intermittent drive for opening and closing said jaws.

3. In an apparatus for preparing artichokes and like fruit for canning, a frame, a pair of endless chains, a plurality of pairs of sprockets arranged in said frame for supporting said chains for movement with their upper reaches parallel to each other at the upper surface of said frame, intermittent drive means connected to one pair of said sprockets for moving said chains in predetermined steps, a plurality of transverse bars each having its ends secured to said chains so that said bars are spaced equal to said predetermined steps of said chains, a pair of clamping jaws pivotally secured to one of said transverse bars midway its ends for trailing movement behind said bar, a plate under each of said chains for supporting the upper reach thereof in a horizontal plane, each said plate having an upstanding bead, each transverse bar having recesses formed on its under side adapted to ride said upstanding beads, a lug extending from each said jaw perpendicular to the trunnion thereon and having a recess formed on its underside for engagement with the upstanding bead on said plate to thereby maintain said clamping jaws in fruit gripping relation relative to the fruit between them, an initial portion of each of said plates being mounted for pivotal movement between parallelism and spread position relative to each other for opening and closing said jaws, a yoke connecting said initial portions of said plates for movement toward and from each other, and a lever operatively connected to said yoke and said intermittent drive for opening and closing said jaws momentarily between intermittent steps of said chains.

4. In an apparatus for preparing artichokes and like fruit for canning, a frame, a pair of endless chains, a plurality of pairs of sprockets arranged in said frame for supporting said chains for movement in a predetermined loop with their upper reaches disposed in a horizontal plain adjacent the upper surface of said frame, intermittent drive means connected to one pair of said sprockets for moving said chains in predetermined steps, a plurality of flights on said chains spaced from each other a distance coincident to the steps of movement thereof and each comprising a transverse bar having its ends secured to said chains, a pair of clamping jaws each having a trunnion pivotally secured to said transverse bar midway its ends for trailing movement behind said bar, a plate under each of said chains for supporting the upper reach thereof and having an upstanding bead for guiding said transverse bars during movement, a lug extending from each said jaw perpendicular to the trunnion thereon and having a recess formed on its underside engaging the upstanding bead on said plate for maintaining said clamping jaws in gripping relation with a fruit between them, each said plate having an initial portion thereof pivotally mounted on said frame for swinging movement to a position outwardly relative to each other, a yoke connecting the initial portions of said plates for movement in unison toward and from each other and a lever connected to said yoke and operated in timed relation to said intermittent drive for opening and closing said jaws once during the dwell of each intermittent step of said chains.

5. Apparatus for preparing artichokes for canning comprising a frame, a pair of endless chains, a plurality of pairs of sprockets arranged in said frame for supporting said chains for movement in a predetermined loop and with their upper reaches extending horizontally across said frame, intermittent drive means connected to one pair of said sprockets for advancing said chains in steps, a plate in said frame for supporting said chains and including an upstanding bead spaced inwardly from each of said chains, a fruit orienting cup between said plates and below said chains at the initial end of the upper reaches thereof, a plurality of flights between said chains spaced at intervals equal to the steps of advance thereof and comprising a transverse bar having its ends secured to said chains and supported on said plates, a pair of jaws each having trunnions pivotally secured midway the ends of said transverse bar for trailing movement behind the same, whereby said jaws register with said fruit orienting cup between said steps of said chains, a lug on each of said jaws extending onto said plates and having a recessed bottom adapted to ride said bead thereon for maintaining said jaws in closed position, means for mounting the initial portion of said plates for swinging movement away from parallel relation for opening said jaws, a yoke connecting the free ends of said initial portions of said plates for effecting movement thereof toward and from each other, a cam operable in timed relation with said intermittent drive, and a lever pivotally mounted on said frame pivotally connected to said yoke and engaging said cam for opening and closing said jaws while they idle in register with said fruit orienting cup.

6. In an apparatus of the type described including a feed cup, disposed in a predetermined path within a frame, the combination of a pair of endless chains, a plurality of pairs of sprockets arranged in said frame for supporting said chains for movement in a predetermined loop and with their upper reaches extending parallel to and straddling said predetermined path, a plate in said frame for supporting the upper reaches of said chains and including an upstanding bead spaced inwardly from each of said chains, a plurality of flights between said chains comprising a transverse bar having its ends secured to said chains and supported on said plates, a pair of jaws each having trunnions pivotally secured midway the ends of said transverse bar for trailing movement behind the same, a lug on each of said jaws extending onto said plates and having a recessed bottom adapted to ride said bead thereon for holding said jaws in closed position, means for mounting the initial portion of said plates for swinging movement away from parallel relation for effecting opening of said jaws when they register with said feed cup, a yoke connecting the free ends of said initial portions of said plates for effecting movement thereof toward and from each other, intermittent drive means connected to one pair of said sprockets for advancing said jaws in steps for registration with said feed cup, a cam operatively connected with said drive means, and a lever pivotally mounted on said frame having pivotal connection with said yoke and engaging said cam for opening and closing said jaws while they idle above said feed cup.

7. In an apparatus of the type described including a feed station within a frame, the combination of a pair of endless chains, a plurality of pairs of sprockets arranged in said frame for supporting said chains for movement in a predetermined loop and with their upper reaches extending parallel and straddling said feed station, intermittent drive means connected to one pair of said sprockets for advancing said chains in steps, plates in said frame under the upper reach of each of said chains and including an upstanding bead spaced inwardly of each chain, a plurality of flights on said chains at intervals equal to the steps of advance thereof and each comprising a transverse bar having its ends secured to said chains, a pair of jaws each having trunnions pivotally secured midway the ends of said transverse bar for trailing movement behind the same, a lug on each of said jaws extending onto the adjacent plate and having a recessed bottom adapted to ride the bead on said plate for maintaining said jaws in closed position, means for mounting the initial portion of said plates for swinging movement away from parallel relation for effecting opening of said jaws, a yoke connecting the free ends of the initial portions of said plates for effecting movement thereof toward and from each other, a cam on said intermittent drive, and a lever pivotally mounted on said frame having one end pivotally connected to said yoke and its opposite end engaging said cam for moving said yoke to open and close said jaws during the dwell of said jaws at said feed station between steps of said chains by said intermittent drive.

References Cited in the file of this patent

UNITED STATES PATENTS

| | | |
|---|---|---|
| 1,830,199 | Gardner | Nov. 3, 1931 |
| 2,227,794 | Phillips, Jr. | Jan. 7, 1941 |
| 2,319,281 | Winters | May 18, 1943 |
| 2,342,131 | Erickson | Feb. 22, 1944 |
| 2,404,460 | Rolker | July 23, 1946 |